(12) United States Patent
Ripp

(10) Patent No.: US 12,383,970 B2
(45) Date of Patent: Aug. 12, 2025

(54) ROLLER-SKATE BEARING SEAT TRUING TOOL

(71) Applicant: Skates US, Inc., Richmond, IN (US)

(72) Inventor: David J. Ripp, Richmond, IN (US)

(73) Assignee: Skates US, Inc., Richmond, IN (US)

( * ) Notice: Subject to any disclaimer, the term of this patent is extended or adjusted under 35 U.S.C. 154(b) by 1002 days.

(21) Appl. No.: 17/475,948

(22) Filed: Sep. 15, 2021

(65) Prior Publication Data

US 2023/0081005 A1    Mar. 16, 2023

(51) Int. Cl.
| | |
|---|---|
| *B23D 75/00* | (2006.01) |
| *B23Q 16/00* | (2006.01) |
| *B23B 51/10* | (2006.01) |
| *B23D 77/14* | (2006.01) |

(52) U.S. Cl.
CPC ......... *B23D 75/005* (2013.01); *B23Q 16/006* (2013.01); *B23B 51/101* (2013.01); *B23B 51/107* (2013.01); *B23B 2215/12* (2013.01); *B23D 77/14* (2013.01); *B23D 2277/50* (2013.01); *B23D 2277/68* (2013.01); *F16C 2316/30* (2013.01)

(58) Field of Classification Search
CPC .. B23D 75/005; B23D 77/14; B23D 2277/50; B23D 2277/68; B23D 2277/80; B23D 79/08; B23D 79/04; B23Q 16/006; B23B 51/101; B23B 51/107; B23B 2215/12; B23B 51/109; B23B 2251/12; B23B 45/06; F16C 2316/30; F16C 19/52; F16C 35/067; F16C 43/04; F16C 2322/50; A63C 17/0006; A63C 17/0013; B23P 15/003
See application file for complete search history.

(56) References Cited

U.S. PATENT DOCUMENTS

| | | | |
|---|---|---|---|
| 3,070,926 A | 1/1963 | Kidd | |
| 4,440,531 A * | 4/1984 | Astle | B23B 51/107 408/229 |
| 5,678,582 A | 10/1997 | McClure | |
| 2010/0054883 A1* | 3/2010 | Katzenberger | B23B 49/00 408/225 |

FOREIGN PATENT DOCUMENTS

| | | |
|---|---|---|
| CN | 201544133 | 8/2010 |
| GB | 105427 | 2/1934 |
| KR | 200348308 | 5/2004 |
| WO | WO-2021245147 A1 * | 12/2021 ........... B23B 51/101 |

OTHER PUBLICATIONS

Bones skate bearings cleaning unit (https://www.amazon.com/Bones-Skate-Bearings-Cleaning-Unit/dp/B000GL232G?th=1) Accessed on Apr. 16, 2021.

* cited by examiner

*Primary Examiner* — Alan Snyder
(74) *Attorney, Agent, or Firm* — Dinsmore & Shohl, LLP

(57) ABSTRACT

Embodiments of the present disclosure are directed to a roller-skate bearing seat truing tool comprising a plurality of spaced teeth, a first handle, and a second handle. The plurality of spaced teeth may be operable to true up a cylindrical surface of a roller-skate bearing seat and a vertical surface of the roller-skate bearing seat. The first handle may comprise a protrusion longitudinally extending from one end. The second handle may comprise a receptacle at one end configured to slidably receive the protrusion. The plurality of spaced teeth may be disposed about an upper rim of the receptacle, on an upper rim of the first handle, about the protrusion, or both.

16 Claims, 4 Drawing Sheets

ROLLER-SKATE BEARING SEAT TRUING TOOL

TECHNICAL FIELD

Embodiments of the present disclosure generally relate to bearing tools, and more specifically, to roller skate bearing seat truing tools.

BACKGROUND

Roller-skate wheels have one set of bearings on each side of the wheel. As do most bearings, each set of roller-skate bearings sits in an inner and outer race. In roller-skates, the outer bearing races sit in a seat in the wheel (the "circumferential bearing seat"), typically made of the same material as the wheel. The inner bearing races contact the axle and/or a spacer. Additionally, the outer bearing races contact a flat, inner surface of the wheel (the "vertical bearing seat"), parallel to the wheel rotation. If the circumferential bearing seat or the vertical bearing seat is deformed due to manufacturing defects or use, the bearings will not align properly. Improperly aligned bearings may result in added drag during skating. In extreme cases, improperly aligned bearings will not allow an axle to pass through both sets of bearings. Accordingly, it is often necessary to "true-up" the bearing seats before installing bearings into the wheels.

Present bearing truing tools can provide some truing of the circumferential bearing seat. However, they are unable to provide the required truing of the vertical bearing seat. Accordingly, there remains a need for a bearing seat truing tool which can true both the vertical and circumferential bearing seats.

SUMMARY

Embodiments of the present disclosure address this need by providing a roller-skate bearing seat truing tool comprising a plurality of spaced teeth operable to true up a cylindrical surface of a roller-skate bearing seat and a vertical surface of a roller-skate bearing seat.

In one embodiment, a roller-skate bearing seat truing tool may comprise a plurality of spaced teeth, a first handle, and a second handle. The plurality of spaced teeth may be operable to true up a cylindrical surface of a roller-skate bearing seat and a vertical surface of the roller-skate bearing seat. The first handle may comprise a protrusion longitudinally extending from one end. The second handle may comprise a receptacle at one end configured to slidably receive the protrusion. The plurality of spaced teeth may be disposed about an upper rim of the receptacle or on an upper rim of the first handle, about the protrusion, or both.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describes various embodiments and are intended to provide an overview or framework for understanding the nature and character of the claimed subject matter. The accompanying figure is included to provide a further understanding of the various embodiments, and are incorporated into and constitute a part of this specification.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Embodiments of the present disclosure address the need for a bearing seat truing tool capable of truing both the vertical and circumferential bearing seats of a roller-skate wheel. The improved features include the ability to true vertical and circumferential bearing seats, portions of the tool adapted to allow the application of mechanical force, and a portions of the tool adapted to aligning the handles with both one another and with the wheel.

Definitions

As used herein, the terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Embodiments

Figure 1:
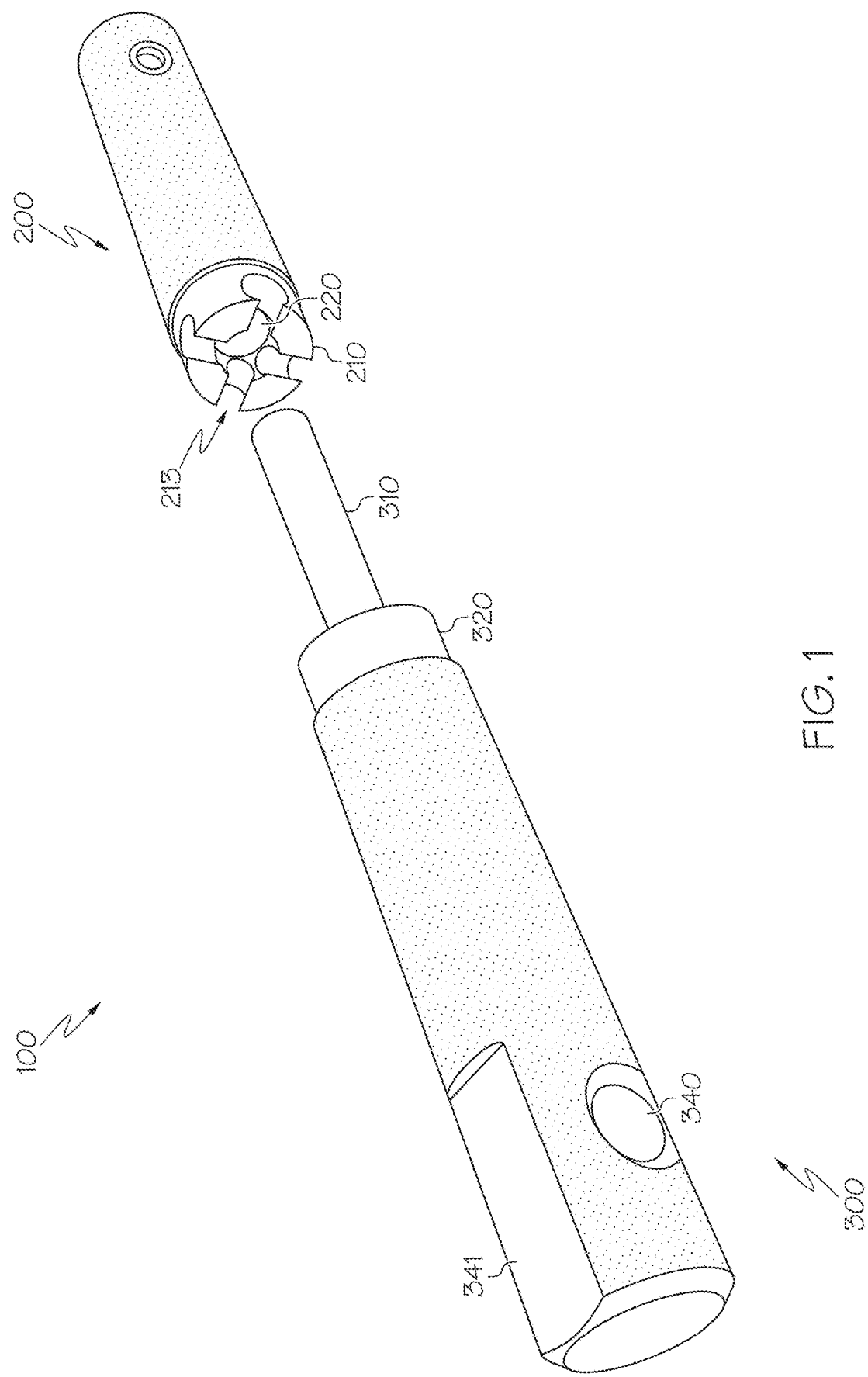
FIG. 1 is an exploded view of some embodiments of the present disclosure.

Referring now to FIG. 1, embodiments of the present disclosure are directed to a roller-skate bearing seat truing tool ("the tool") 100. The roller-skate bearing seat truing tool 100 may comprise a plurality of spaced teeth 210, a first handle 300, and a second handle 200.

Figure 4:
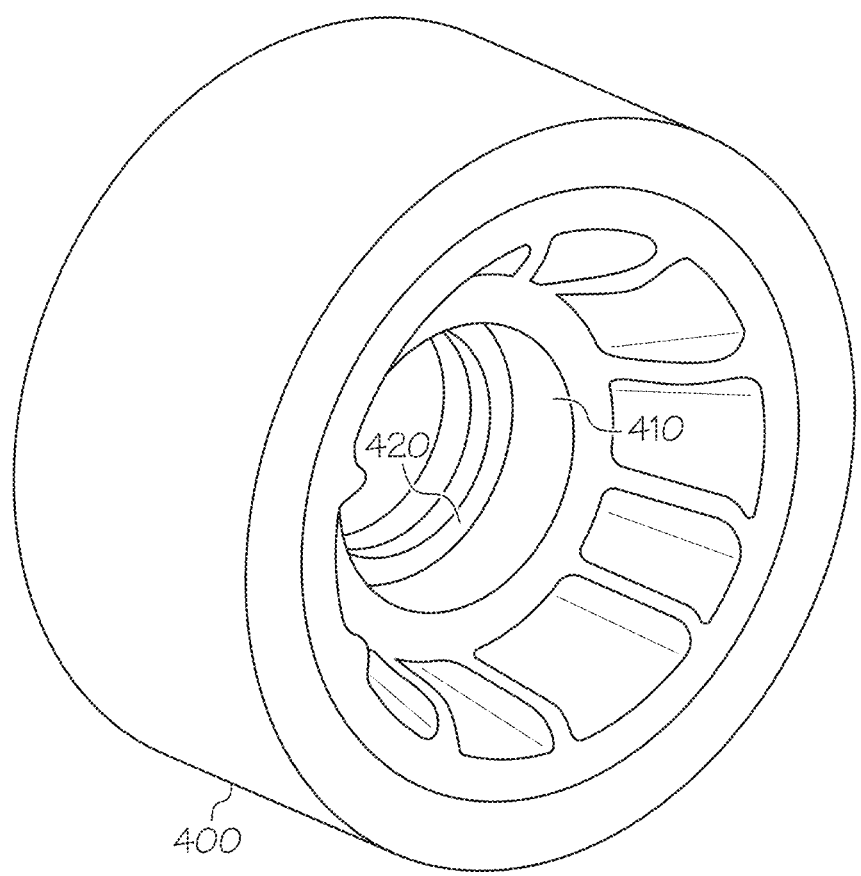
FIG. 4 is a close up view of the inside surfaces of a skate wheel.

Referring now to FIG. 4, the roller-skate wheel 400 may have a bearing seat which holds the bearings. The bearing seat may have a cylindrical surface 410 and a vertical surface 420. The plurality of spaced teeth may be operable to true-up the cylindrical surface 410 and the vertical surface 420 of the bearing seat.

Figure 3:
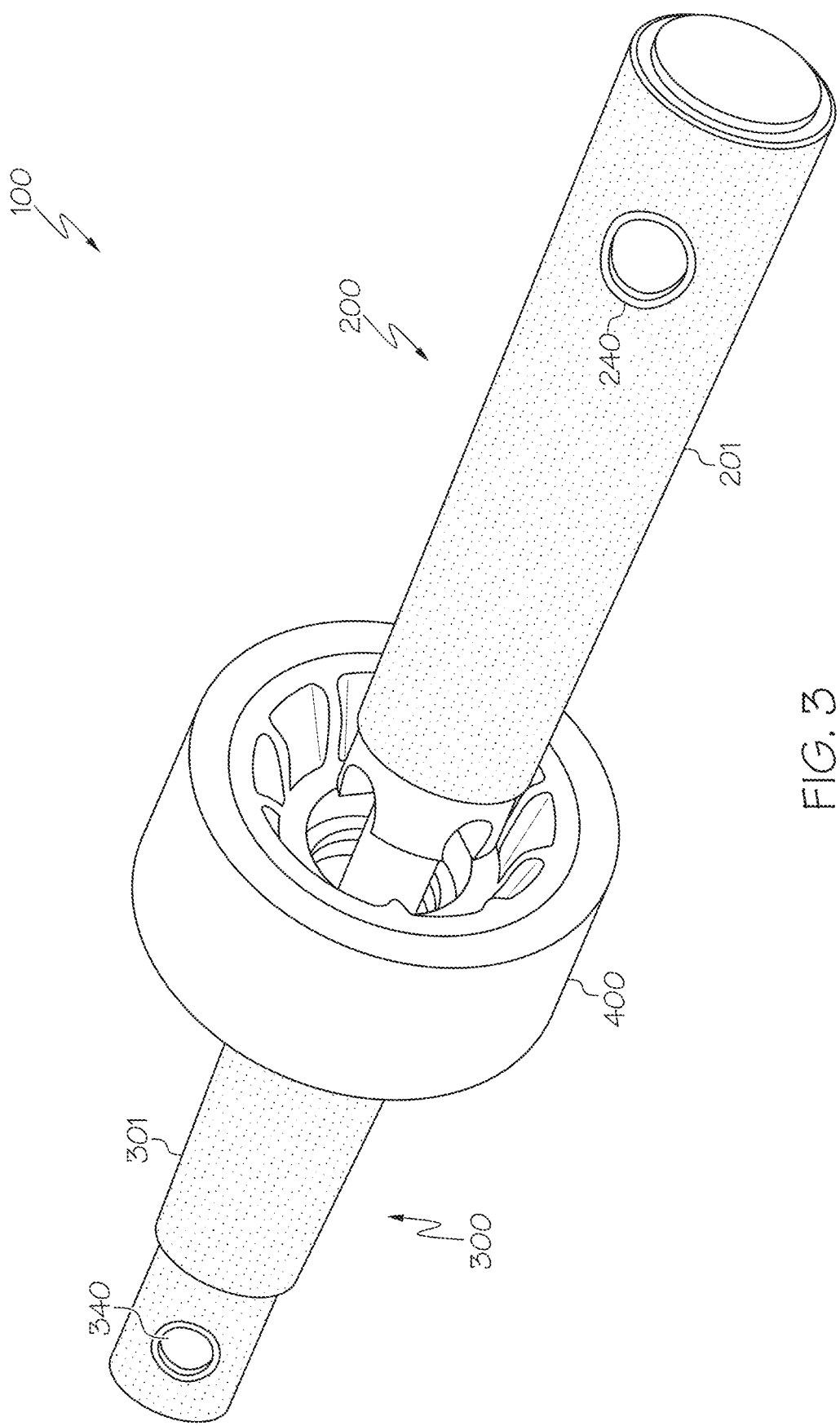
FIG. 3 is a view of some embodiments of the present disclosure in use, truing a roller-skate wheel.

Referring again to FIG. 1, the first handle 300 may comprise a protrusion 310 longitudinally extending from one end. The protrusion 310 may be adapted to act as a guide pin and align the first handle 300 with the second handle 200. Referring now to FIG. 3, the protrusion 310 may act in concert with other portions of the tool 100 to align the tool 100 with the wheel 400. Aligning the tool 100 with the wheel 400 is believed to align the bearings with the wheel 400, which will result in the lowest rolling resistance during operation of the wheel 400.

Referring again to FIG. 1, the protrusion 310 may be cylindrical in shape. The protrusion 310 may be long and wide enough to impart stability in connecting the first handle 300 and the second handle 200. For example, the protrusion 310 may be at least 1 inch ("in"), at least 2 in, at least 3 in, at least 4 in, or at least 5 in in length. The protrusion 310 may be at least ⅛ in, at least ¼ in, at least ½ in, or at least ¾ in in diameter.

The first handle 300 may comprise an upper rim 320 disposed coaxially about the protrusion 310 extending therefrom. The upper rim 320 may function in concert with other components to help align the tool 100 with the wheel 400. For example, the upper rim 320 may provide pressure to stabilize the wheel as the spaced teeth 210 true-up (cut) the wheel.

The second handle 200 may comprise a receptacle 220 at one end configured to slidably receive the protrusion 310. The receptacle may be close enough in diameter to the protrusion 310 that the tool 100 stays firmly aligned during use and the handles do not wobble relative to one another. The receptacle may be enough larger in diameter than the protrusion 310 such that the protrusion 310 may enter the receptacle and rotate freely therein. The receptacle 220 may include bearings or bushings to allow smoother movement of the protrusion 310.

The receptacle may have a longitudinal depth configured such that the upper rim 320 of the first handle is spaced from the upper rim of the receptacle of the second handle when the first and second handles are connected.

The receptacle may have a longitudinal depth configured such that, when the first handle 300 and the second handle 200 are connected, the spaced teeth 210 and either the upper rim of the receptacle 220 or the upper rim 320 of the first handle are separated by the desired thickness of the vertical surface 420 of the bearing seat. For example, when the spaced teeth 210 are disposed on the upper rim of the receptacle and the tool 100 is connected, the receptacle may have a longitudinal depth configured such that the spaced teeth 210 are separated from the upper rim 320 of the first handle 300 by the design thickness of the vertical surface 420 of the bearing seat. The design thickness of the vertical surface 420 of the bearing seat may be about 1 millimeter ("mm"), about 2 mm, about 3 mm, about 4 mm, about 5 mm, about 6 mm, about 7 mm, about 8 mm, about 9 mm, or about 10 mm.

Each of the protrusion 310 and the receptacle 220 may be cylindrical. In some embodiments, the protrusion 310, the receptacle 220, or both may only be partially cylindrical. For example, the protrusion 310, the receptacle 220, or both may comprise a cylinder with a cone or frustum on the end. Together, these shapes may allow the user to both insert the protrusion 310 into the receptacle 220 and rotate the protrusion 310 therein. Additionally, the protrusion 310, the receptacle 220, or both may include machining artifacts which detract from their cylindrical nature but still allow the handles to rotate freely when connected.

The first handle 300 and the second handle 200 may not be permanently connected. Rather, the first handle 300 and the second handle 200 may only be connected through the protrusion 310. The first handle 300 and the second handle 200 may be temporarily connected through the protrusion 310 when the tool 100 is in use.

The first handle 300 and the second handle 200 may be cylindrical. As used herein, cylindrical may include shapes which are substantially cylindrical and form a handle. For example, the first handle 300 and the second handle 200 may be hexagonal or octagonal columns. According to some embodiments, the first handle 300 and the second handle 200 may have the same shape. According to alternate embodiments, the first handle 300 and the second handle 200 may not have the exact same shape. For example, the first handle 300 may have a circular exterior while the second handle 200 may have an octagonal exterior.

The surface 301 of the first handle 300 and the surface 201 of the second handle 200 may be textured. This texturing may be engraved or applied. The texturing may be applied as paint or as a film. Textured handles may be particularly preferable when the handle has a circular exterior.

Figure 2:
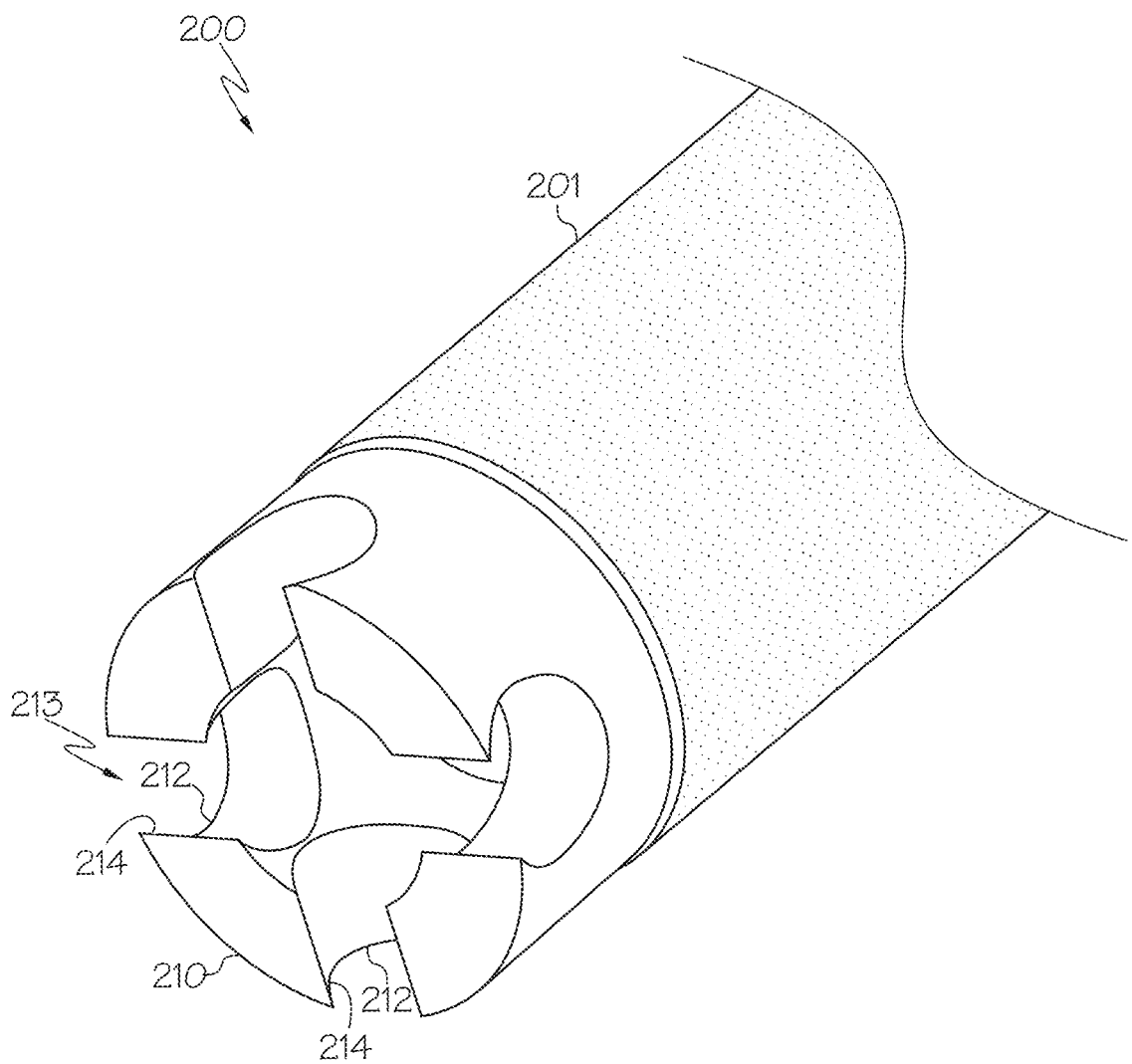
FIG. 2 is a close up view of some embodiments of the present disclosure.

Referring to FIG. 2, the roller-skate bearing seat truing tool 100 may also comprise a plurality of spaced teeth 210 operable to true up a cylindrical surface 410 of a roller-skate bearing seat and a vertical surface 420 of the roller-skate bearing seat. The plurality of spaced teeth 210 may true-up the vertical surface 420 and the cylindrical surface 410 of the roller-skate bearing seat by cutting into the material of the seat. Accordingly, the spaced teeth 210 may be shaped to have leading edges 212, 214 and be sharpened upon those leading edges 212, 214. The sharpened leading edges 212, 214 may be shaped to contact the cylindrical surface 410 and the vertical surface 420 when the tool 100 is in use.

The plurality of spaced teeth 210 may have sharpened leading edges 212, 214 operable to cut into the cylindrical surface 410 and the vertical surface 420 of the wheel 400 when the second handle 200 is turned in a clockwise manner, a counterclockwise manner, or both. According to some embodiments, the sharpened leading edges 212, 214 may only be operable when the second handle 200 is turned in a single direction (clockwise or counterclockwise).

The plurality of spaced teeth 210 are disposed about an upper rim of the receptacle 220, on an upper rim 320 of the first cylindrical handle, about the protrusion 310, or a combination thereof. For example, as is shown in FIG. 2, the plurality of spaced teeth 210 may be disposed about the receptacle 220. Manufacturing may be simpler and less costly if the plurality of spaced teeth 210 are disposed about the receptacle.

The plurality of spaced teeth 210 may comprise an even number of spaced teeth 210. For example, the plurality of spaced teeth 210 may comprise four spaced teeth 210.

The plurality of spaced teeth 210 may be separated by at least partially cylindrical openings 213. The at least partially cylindrical openings 213 may help to temporarily store shaved material until the tool is removed from the wheel 400 referring to FIG. 4, as well as simplifying manufacturing.

The first handle 300, the second handle 200, or both may comprise a portion 240, 340, 341 adapted for the application of additional leverage on the tool 100. For example, the first handle 300, the second handle 200, or both may comprise a hole 240, 340 for the insertion of a breaker bar. In other examples, the first handle 300, the second handle 200, or both may comprise one or more flat spots 341 to allow the application of a wrench or vise. As depicted in FIG. 1, both the breaker bar insertion embodiment and the flat spot embodiments may exist in a single embodiment.

The handles 200, 300 may be made of a metal such as steel, iron, or aluminum. In alternate embodiments, the handles may be made of a softer material such as wood or plastic. It should be understood that in softer embodiments, the spaced teeth 210 should still be made of a metal, such as steel or aluminum.

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

It should be understood that while embodiments of this invention are directed to roller-skate wheels, it is contemplated that the invention may be useful for truing other wheels. For example, the invention may be sized and adapted to true skateboard wheel bearing seats.

I claim:

1. A roller-skate bearing seat truing tool comprising:
    a plurality of spaced teeth operable to true up a cylindrical surface of a roller-skate bearing seat and a vertical surface of the roller-skate bearing seat;
    a first handle comprising a protrusion longitudinally extending from one end; and
    a second handle comprising a receptacle at one end configured to slidably receive the protrusion; wherein the plurality of spaced teeth are disposed about an upper rim of the receptacle, on an upper rim of the first handle, about the protrusion, or a combination thereof.

2. The roller-skate bearing seat truing tool of claim 1, wherein the first handle and the second handle are not permanently connected.

3. The roller-skate bearing seat truing tool of claim 1, wherein the upper rim of the first handle is disposed coaxially about the protrusion extending therefrom.

4. The roller-skate bearing seat truing tool of claim 3, wherein the receptacle has a longitudinal depth configured such that the upper rim of the first handle is spaced from the upper rim of the receptacle of the second handle when the first handle and the second handle are connected.

5. The roller-skate bearing seat truing tool of claim 1, wherein the first handle and the second handle are cylindrical.

6. The roller-skate bearing seat truing tool of claim 1, wherein a surface of the first handle, a surface of the second handle, or both of the roller-skate bearing seat truing tool is roughened to provide grip for a hand.

7. The roller-skate bearing seat truing tool of claim 1, wherein each of the protrusion and the receptacle are cylindrical.

8. The roller-skate bearing seat truing tool of claim 1, wherein the first handle, the second handle, or both comprise a hole, or a clamping surface adapted for the application of additional leverage on the roller-skate bearing seat truing tool.

9. The roller-skate bearing seat truing tool of claim 1, wherein the protrusion is adapted to act as a guide pin and align the first handle with the second handle.

10. The roller-skate bearing seat truing tool of claim 1, wherein the plurality of spaced teeth comprises four spaced teeth.

11. The roller-skate bearing seat truing tool of claim 1, wherein the plurality of spaced teeth are separated by at least partially cylindrical openings.

12. The roller-skate bearing seat truing tool of claim 1, wherein each of the plurality of spaced teeth is operable to both true up the cylindrical surface and true up the vertical surface of the roller-skate bearing seat.

13. The roller-skate bearing seat truing tool of claim 1, wherein each of the plurality of spaced teeth is operable to only true up the cylindrical surface and true up the vertical surface of the roller-skate bearing seat.

14. The roller-skate bearing seat truing tool of claim 1, wherein the first handle and the second handle are configured to be gripped by a hand.

15. A roller-skate bearing seat truing tool comprising:
    a plurality of spaced teeth operable to true up a cylindrical surface of a roller-skate bearing seat and a vertical surface of the roller-skate bearing seat;
    a first handle comprising a protrusion longitudinally extending from one end; and
    a second handle comprising a receptacle at one end configured to slidably receive the protrusion; wherein the first handle and the second handle are not permanently connected,
    the upper rim of the first handle is disposed coaxially about the protrusion extending therefrom,
    the plurality of spaced teeth are disposed about an upper rim of the receptacle, and
    the receptacle has a longitudinal depth configured such that the upper rim of the first handle is spaced from the plurality of spaced teeth when the first handle and the second handle are connected.

16. A roller-skate bearing seat truing tool comprising:
    a plurality of spaced teeth operable to true up a cylindrical surface of a roller-skate bearing seat and a vertical surface of the roller-skate bearing seat;
    a first handle comprising a protrusion longitudinally extending from one end; and
    a second handle comprising a receptacle at one end configured to slidably receive the protrusion; wherein:
    the plurality of spaced teeth are disposed about an upper rim of the receptacle, on an upper rim of the first handle, about the protrusion, or a combination thereof; and
    a surface of the first handle and a surface of the second handle of the roller-skate bearing seat truing tool are roughened to provide grip for a hand.

* * * * *